United States Patent [19]
Millard

[11] Patent Number: 6,070,697
[45] Date of Patent: Jun. 6, 2000

[54] ROTATING LUBRICATION APPLICATOR AND METHODS FOR USING SAME

[75] Inventor: Raymond E. Millard, Huntington Beach, Calif.

[73] Assignee: TCI, Inc., Hope, Id.

[21] Appl. No.: 09/071,461

[22] Filed: May 1, 1998

Related U.S. Application Data

[60] Provisional application No. 60/046,988, May 1, 1997, and provisional application No. 60/045,522, May 2, 1997.

[51] Int. Cl.$^7$ ........................................ F16N 7/16
[52] U.S. Cl. ............................ 184/15.1; 184/17; 184/23; 464/91; 464/133; 464/139
[58] Field of Search ............................ 184/15.1, 17, 23; 464/43, 44, 45, 109, 133, 139, 161, 91

[56] References Cited

U.S. PATENT DOCUMENTS

| | | | |
|---|---|---|---|
| 905,756 | 12/1908 | Skinner | 184/15.1 |
| 1,186,434 | 6/1916 | Pierce | 184/15.1 |
| 1,687,688 | 10/1928 | Perry | 184/15.1 |
| 1,706,653 | 3/1929 | Chandler | 184/15.1 |
| 1,914,093 | 6/1933 | Adams | 184/15.1 |
| 2,059,856 | 11/1936 | Eastman et al. . | |
| 2,655,222 | 10/1953 | Warwick | 184/15.1 |
| 2,737,264 | 3/1956 | Klaucke | 184/15.1 |
| 2,852,097 | 9/1958 | Proctor . | |
| 3,055,297 | 9/1962 | Leeds . | |
| 3,367,445 | 2/1968 | Heindl et al. . | |
| 3,541,011 | 11/1970 | Davis et al. . | |
| 3,719,254 | 3/1973 | Snider . | |
| 3,807,530 | 4/1974 | Fodali . | |
| 4,175,642 | 11/1979 | Bianchi et al. . | |
| 4,344,278 | 8/1982 | Jamison et al. . | |
| 4,482,430 | 11/1984 | Majaniemi | 162/358 |
| 4,486,319 | 12/1984 | Jamison . | |
| 4,619,345 | 10/1986 | Rands . | |
| 4,623,472 | 11/1986 | Jamison et al. . | |
| 4,896,596 | 1/1990 | Helinski . | |
| 5,290,617 | 3/1994 | Mochizuki et al. . | |
| 5,307,902 | 5/1994 | Hermann et al. . | |
| 5,460,243 | 10/1995 | Patterson . | |

OTHER PUBLICATIONS

New Developments in Microporous Polymer Lubricants, p. 274, May 1985, Lubrication Engineering.

*Primary Examiner*—David M. Fenstermacher
*Attorney, Agent, or Firm*—Moore & Hansen

[57] ABSTRACT

A rotating lubrication applicator is provided for metered lubrication of machine parts including parts of drive mechanisms. The preferred applicator includes an inner hub and an outer lubricating portion. The outer lubricating portion is made out of a solid lubricant containing microporous polymeric matrix material. Tensioning devices including the rotating lubrication applicators are also provided as are methods of using the same. The applicator will provide a metered amount of lubricant to surfaces which come into contact with outer lubricating portion.

6 Claims, 7 Drawing Sheets

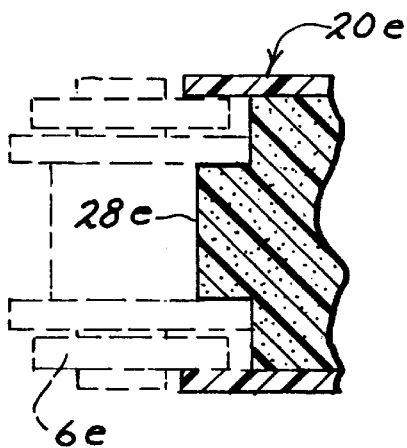
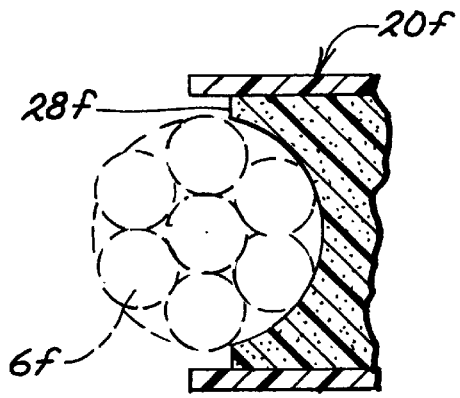
FIG.10  FIG.11
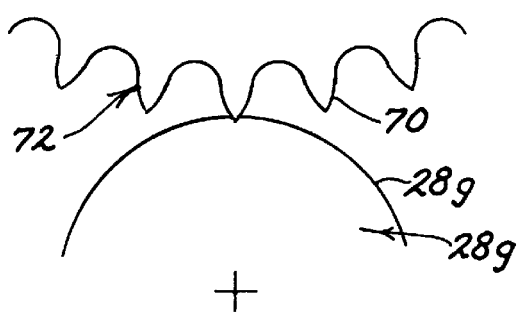
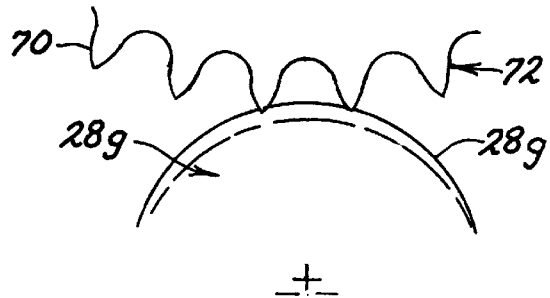
FIG.12A  FIG.12B
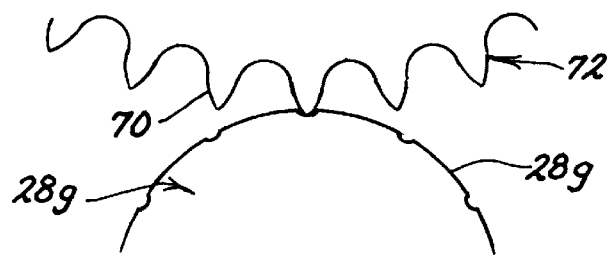
FIG.12C

ROTATING LUBRICATION APPLICATOR AND METHODS FOR USING SAME

CROSS REFERENCE TO OTHER APPLICATIONS

The present application claims the benefit of the earlier filing dates for the following Provisional Applications: U.S. patent application Ser. Nos. 60/046,988 filed May 1, 1997 and 60/045,522 filed May 2, 1997 each entitled: MACHINE LUBRICATION SYSTEM AND METHOD.

FIELD OF THE INVENTION

The present invention relates to lubrication applicators and methods for applying lubricants to machines including manufacturing systems, conveyer systems, cutting machines, motorized vehicles and carts, bikes, chain saws, weed trimmers, lawn mowers, and the like, and specifically to specific parts of machines including chains, gears, cables, wire ropes, and the like. In preferred embodiments the lubrication applicators apply a lubricant, preferably an oil, as they rotate about a shaft as the machine part, such as a chain, cable, gear or wire rope turns or pass within an anticipated path and contacts the rotating applicator. In preferred embodiments, the lubrication applicators of the present invention apply oil, preferably mineral oils, petroleum based oils such as a standard gear oil. Preferably, the lubrication applicators of the present invention include a hub which can rotate upon a shaft, an outer lubricating portion including a microporous polymeric matrix incorporating an oil lubricant is preferably secured to the hub for rotation about such a shaft. The outer lubricating portion may take many shapes including that of a rotating disk which may easily interact with a cable or wire rope or the like, or a sprocket having teeth which engage a drive chain such as a roller chain, engineered class chain commonly used as "conveyor" or "drag" chain, and the like. A drive line tensioning idler and lubrication application device is also disclosed, as are machines including any of the aforementioned devices, and methods of employing such devices to lubricate machines and/or parts of machines.

BACKGROUND OF THE INVENTION

Machinery of all kinds require adequate lubrication to prevent premature wear and/or failure. It is well known that machine operators are required to lubricate moving parts of machines in order to allow them to continue to function without undue wear. In fact, it is likely that proper lubrication is the most important aspect of machine maintenance in normal usage patterns.

There have been numerous inventions which address a need for lubricants to machine parts; see e.g. U.S. Pat. No. 3,719,254 to Snider; U.S. Pat. No. 3,807,530 to Fodali; U.S. Pat. No. 4,896,596 to Helinski; U.S. Pat. No. 5,307,902 to Herrmann et al; and U.S. Pat. No. 5,460,243 to Patterson. Helinski discloses a lubrication system for print hammer mechanisms including channels along the length of the pivot pin which are filled with a porous material containing an oil lubricant. Lubricant is conveyed to the interface between each print hammer element and the pivot pin by capillary action which transfers oil from a principle reservoir. Herrmann et al disclosure an improved shaft lubrication method including a plate of porous material forming capillary passages for the transmission of a lubricant through the shaft from a lubricant reservoir which communicates with the porous material.

Additional references including U.S. Pat. No. 4,175,642 to Bianchi et al; disclose further pass of lubrication methods where surfaces to be lubricated are supplied with lubricating oils by communicating with a reservoir filled with a porous matrix impregnated with oil. U.S. Pat. No. 3,367,445 to Dryden discloses a fluid lubrication system including a porous material containing an oil reservoir in proximity with the face of a bearing or a gear. However, Dryden taught that it was necessary to leave a small gap between the moving part to be lubricated and the porous metal material used to provide the lubricant in order to avoid wear on both the porous material and the moving part. Dryden relies upon capillary action to replenish the oil and centrifugal force to distribute the lubricant on the face of the gear.

U.S. Pat. No. 2,704,465 to Haller discloses a self-lubricating wheel such as a cog wheel, gear, sprocket wheel, rachet wheel, cam or the like. The wheel is made of sintered metal material which contains pores which are reported to allow oil to pass from an internal lubricant reservoir to the external surface to provide a metered amount of lubricant to the "teeth" or "lobes" of the wheel so that a film of lubricant is always present on these teeth without either being excessive in quantity so as to attract dust and other debris, or insufficient in quantity so as a result in inadequate lubrication. In spite of the lubrication provided by the sintered metal wheel, however, it is likely that the metal surface of the wheel would act to abrade surfaces with which it interacts.

Microporous synthetic resin or polymeric matrix materials to incorporate a fluid such as an ink or an oil lubricant have been known for some time. U.S. Pat. No. 3,055,297 to Leads discloses such a microporous synthetic resin material containing non-solvent organic liquid such as alcohols, glycols, petroleum ether, esthleen, mineral spirits, petroleum spirits, kerosene and the like. A number of synthetic resins may be used including polystyrene, polyvinyl chloride, polysocyanates, polyurethane, polyethylene, and the like.

Various other matrices have been developed to retain lubricating oils as a solid microporous polymer lubricant (MPL) composition. Polyethylene polymer matrices are disclosed in U.S. Pat. No. 3,541,011 to Davis et al. Other matrices are also known, such as the matrix disclosed in U.S. Pat. Nos. 4,486,319 and 4,623,472 to Jamison and Jamison et al., respectively, which disclose a microporous solid ionomer polymer lubricant containing composition having a matrix which may include terpolymers of isobutylacrylate, methacrylic acid and/or polyethylene. Other ionomers reported to be alternately useful include copolymers of ethylene and sodium or zinc salts of methacrylic acid. The polymer matrix may also include other polymers, such as for example, polyethylene, polypropylene, and the like. Other proprietary microporous polymer lubricants are also known such as propriety Micropoly® lubricants sold by PhyMet, Inc. Springboro, Ohio.

Unfortunately these microporous polymer lubricants do not withstand abrasion, friction and the application of force by hard metal or other objects and can abrade away rapidly upon use in situations where mechanical force or abrasion is applied to the surfaces of such materials.

Such abrasion can be envisioned in the sliding structures for heavy loads disclosed in U.S. Pat. No. 5,290,617 to Mochizuki et al. wherein a solid lubricating material is buried in a sliding surface and an oil reservoir of predetermined capacity is maintained on the reverse side of the sliding surface to provide a source of lubricant which passes through pores of the solid lubricating material to the sliding surface. Nevertheless, abrasion will occur and the sliding surface will wear due to the abrasion resulting from the sliding along the surface.

U.S. Pat. No. 4,177,727 to Cooke et al discloses a line printer character chain lubricating device including a piece of flexible, reportedly abrasion-resistance, microporous neutral rubber that is impregnated with a lubricating oil. The mitral rubber is reported to have a smooth convex surface for contacting the character chain. Depressions in nitrile rubber beside the convex surface serve as charging reservoirs for the lubricating oil. Because of the abrasion likely to occur when the character chain passes over the nitrile rubber lubricating surface, "abrasion-resistance" polymer material was necessary for this particular application. In any case, abrasion will still occur as the chain passes over the microporous polymer surface.

It will be appreciated, therefore, that further improvements in lubricating systems are needed to address the need for lubrication to the many systems and devices used in industry today to reduce wear upon expensive capital machinery and the like. The present invention provides solutions to many needs for lubrication of machinery and machine parts such as chains, gears, cables, wire ropes and the like. Environmental and safety considerations are additional factors driving this invention as this applicator eliminates excessive lubrication and resultant slippery work surfaces for employees when application systems are used which apply excessive amounts of lubrication.

SUMMARY OF THE INVENTION

The present lubrication applicator includes a microporous polymer lubricating material which interacts which various machinery parts to transfer a lubricant to the surface of the machinery part so that the part will be adequately lubricated. Preferably, the lubrication applicator will rotate about a shaft. The lubrication applicator preferably includes a rotatable disk or lubricating member having an inner hub, preferably made of a hard abrasion-resistant material such as a metal material or other hard materials, and an outer solid lubricant material such as one of the microporous polymer lubricant materials known in the art which provide a polymeric matrix to retain a lubricant such as mineral oil, gear oil, and the like. The present invention also includes lubricant application systems including rotating lubrication applicators, such as those described above, which strategically transfer a metered amount of oil or other lubricant to machine parts of various kinds or types.

The present applicators are made at least in part of a solid microporous polymer lubricant material which contains or is at least partially impregnated with an oil or other lubricating agent in such a way that the oil or other lubricating agent can be transferred from the surface of the applicator to a surface of the machine part in need of lubrication. The surface of the applicator is then replenished with oil or other lubricant so that the lubricating agent can continue to be transferred to the surfaces of the machine parts, thereby metering the lubricating agent onto the respective machine part surfaces. In preferred embodiments, the applicator is a rotating device made at least partially of such solid microporous polymer lubricating material, preferably shaped like a gear, sprocket, roller or other rotating device having a continuous circumferential surface. The preferred solid microporous polymer lubricating material may include additional lubricating materials in addition to oil or other liquid lubricants. In alternate embodiments, the applicator of the present invention may contain reservoirs for additional oil or other lubricating material which will feed into the porous polymer matrix so that when the lubricating material within the matrix is transferred out of the matrix over time to the machine part surfaces as intended, new lubricating materials will replenish that which is removed from the surface of the solid matrix or often additional lubrication for extreme duty applications.

The present invention also includes rotating lubrication applicators secured to a shaft around which the applicator can rotate, the shaft secured to a tensioning arm which creates a biasing force against a machine part such as a gear, a chain, a belt, a cable, a wire rope or the like.

The present invention also includes machines comprising a plurality or moving parts, a lubrication application of the kind discussed above which is designed and arranged to provide lubrication to one or more moving parts. The present invention also includes a method of using a lubrication applicator of the present invention to adequate lubrication to parts of a machine having one or more moving parts.

It is an object of the present invention to provide a lubrication applicator which can meter an appropriate amount of lubricating agent onto machine parts in need of lubrication in a manner which minimizes the need for labor and does so in an efficient manner. In this regard, further objects include protecting the environment as well as providing safer work places for employees by eliminating over lubrication of the lubricants in industrial setting which can result in slippery floors, and employee injuries from falls resulting form the same. Further objects include the reduction of maintenance costs, the increase in machine life, the dampening of noise levels in manufacturing or other industrial settings, and the reduction of costs for lubricating. It is a further object to combine tensioning of drive lines with lubrication of the parts thereof.

The above-described features and advantages along with various other advantages and features of novelty are pointed out with particularity in the claims of the present invention which are next hereto and form a further part hereof. However, for better understanding of the invention, its advantages and objects attained by its use, reference should be made to the drawings which form a further part hereof and to the accompanying descriptive manner in which there is illustrated and described preferred embodiments of the present invention.

BRIEF DESCRIPTION OF THE DRAWINGS

Referring to the drawings, where like numerals refer to like parts throughout the several views:

FIG. 10 is a partial cross-sectional view of an alternate lubrication applicator of the present invention similar to that shown in FIG. 9, but having a formed outer circumferential surface designed and arranged to accommodate a roller chain similar to that partially shown in phantom;

FIG. 11 is a partial cross-sectional view of an alternate embodiment of the lubrication applicator shown in FIG. 9, but having a formed circumferential surface designed and arranged to engage a steel cable or wire rope similar to that shown in the cross-sectional portion shown in phantom in this Figure;

FIGS. 12A, 12B, and 12C are schematic representations of the interaction of a portion of a normal gear, having a series of lobed teeth, and an outer lubrication portion of an alternate embodiment of the lubrication applicator of the present invention, similar to that shown in FIG. 8, over a period of time in which the teeth of the gear wear into the circumferential outer surface of the outer lubricating portion of the alternate lubrication applicator as time passes, thereby creating a wear pattern which is anticipated to improve the degree to which surface areas on the lobed teeth of the gear interact with surfaces on the outer circumferential surface of the outer lubricating portion of the alternate lubrication applicator;

DETAILED DESCRIPTION OF THE PREFERRED EMBODIMENTS

Figure 1:
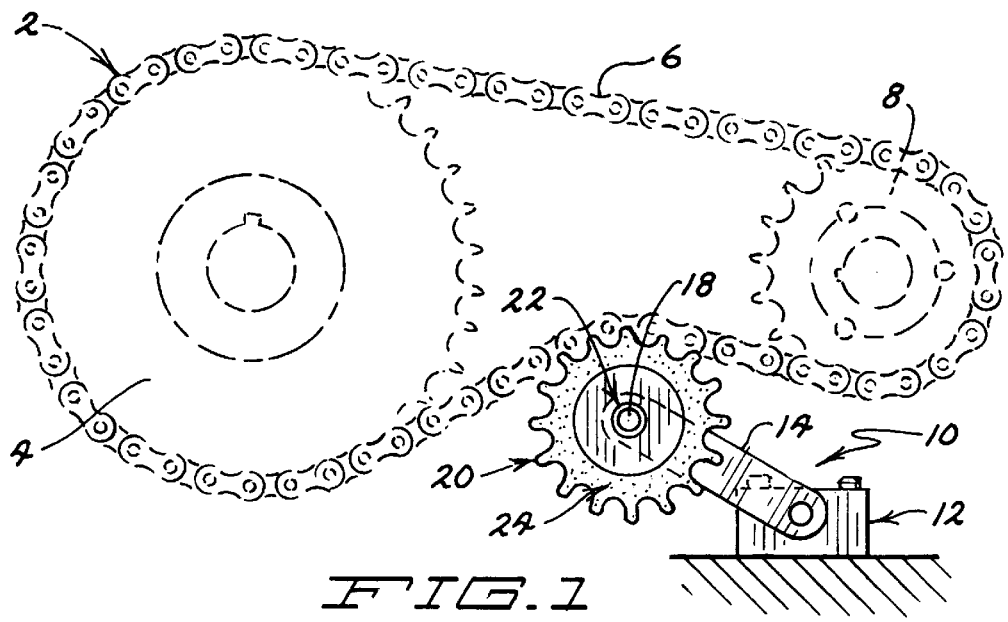
FIG. 1 is a schematic representation of a chain drive mechanism including a larger driven sprocket engaged with a roller chain driven by a smaller drive sprocket; the roller chain supported by a tensioning idler and lubricant application device of the present invention including a lubrication applicator of the present invention rotatably engaged on a shaft of a tensioning arm of a tensioning device.

Referring to FIG. 1 a standard drive mechanism 2 is shown, including a larger driven sprocket 4 driven by a drive line 6, in this case a roller chain, which is driven by a smaller drive sprocket 8. The roller chain 6 is supported by a chain tensioning idler and lubrication applicator device 10 of the present invention. The idler and lubrication applicator device 10 shown in FIG. 1 includes a standard commercially available tensioner 12 having a tensioning arm 14 which is pivotally attached to a housing 16. The tensioning arm 14 includes a shaft 18 to which a lubrication applicator 20 of the present invention is rotatably attached.

Figure 13A:
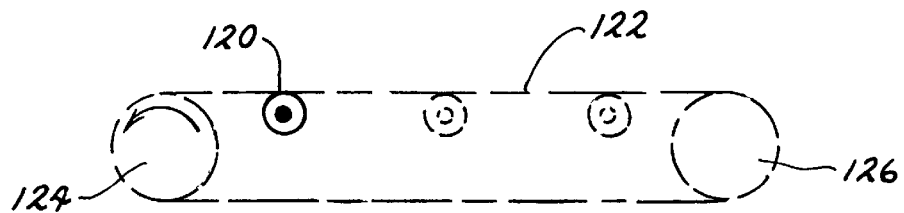
FIG. 13A is a schematic representation of an alternate drive mechanism employing a lubrication applicator of the present invention which rotatably contacts the drive line of the drive mechanism so as to provide support for the drive line and lubrication for the entire mechanism.

Referring now also to FIGS. 13A, 13B, 14A, 14B, 14C and 14D, it will be appreciated that a variety of alternate idler and lubrication applicator devices and/or lubrication applicators of the present invention may be used in many drive systems in industrial machinery, conveyer systems for instance it is shown in FIG. 13A, one or more lubrication applicators 120 of the present invention may be used to support a drive line 122 driven by a drive member 124 which engages the drive line 122 to drive the driven member 126. It will be appreciated, that the examples provided in FIGS. 13A and B and FIGS. 14A, 14B, 14C, 14D are exemplary only and are not intended to limit the drive mechanisms or other applications in which the present lubrication applicator or the idler and lubrication applicator device of the present invention may be used. It will be appreciated that the lubrication applicator 120 may take many forms and may be interconnected with the other portions of the drive mechanisms through various mechanical connections which permit the lubrication applicator 120 to rotate as it interacts with the drive line 122 as it passes over the lubrication applicator 120 in preferred embodiments, the lubrication applicator 120 is interconnected with a tensioning arm (not shown) similar to that shown in FIG. 1 to provide support for the drive line 122. The support also has the added affect of creating additional force on the outer surface of the lubrication applicator 120 by the drive line 122 so that the engagement between the drive line 122 and the outer surface of the lubrication applicator is better and more likely to result in the transfer of a lubricant from the outer surface of the lubrication applicator 120 to the drive line 122.

It will be further appreciated that the drive member 124 and the driven member 126 can be rotating shafts, rotating drums or rotating gears or sprockets and that the drive line 122 may be a cable, wire rope, belt, or chain which interacts with the drive member 124 and the driven member 126 to transfer the mechanical drive force from the drive member to the driven member. For instance, if the drive member and the driven member are both sprockets, as shown in FIG. 1, the drive line 122 will be a drive chain. This chain may take many forms which are well known in the art including a roller chain similar to that shown in phantom in FIG. 1. On the other hand, the drive line 122 may be a wire cable or wire rope, or even a belt made of many different materials some of which may require lubrication, and such a drive line would be appropriately used with various other types of drive and driven members which are well known in the art, such as shafts, rollers, drums, and the like.

Figure 13B:
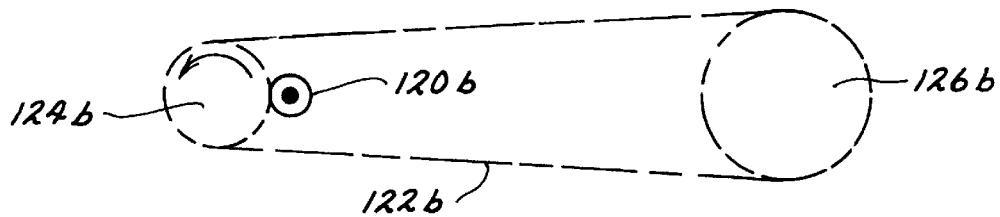
FIG. 13B is a schematic representation of a further alternate drive mechanism wherein a lubrication applicator of the present invention interacts directly with a drive or driven shaft roller or sprocket of the alternate mechanism in order to provide lubrication.
Figure 14A:
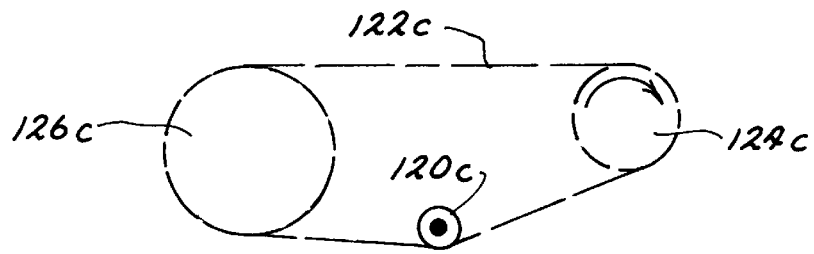
FIGS. 14A, 14B, 14C and 14D are further schematic representations of further alternate drive mechanisms which employ lubrication applicators of the present invention to provide lubrication to the drive mechanism by engaging the drive chain of each of the respective mechanisms.
Figure 14B:
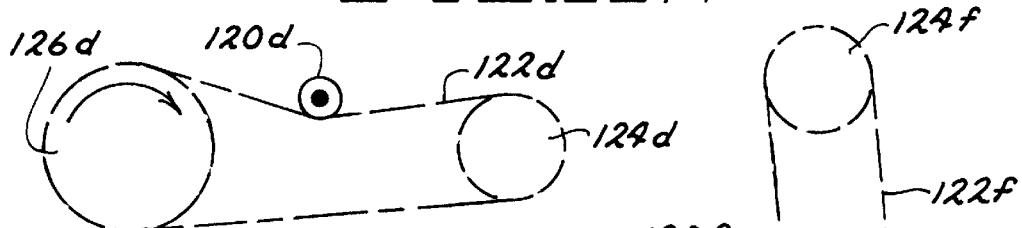
Figure 14C:
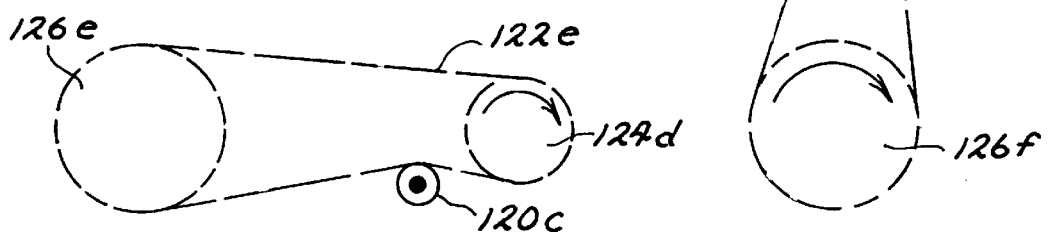
Figure 14D:
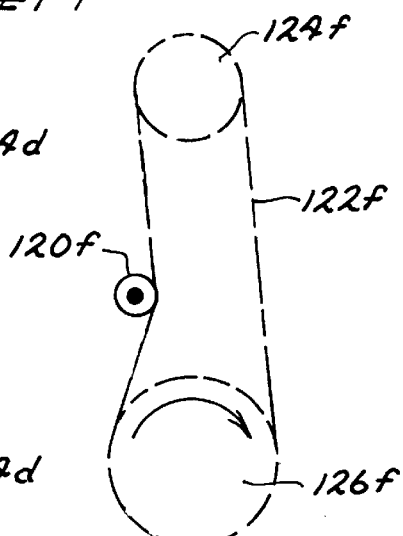

In some cases the object of using the lubrication applicator is to provide lubrication to the drive line 122 or the parts thereof, such as the parts of the roller chain 6 shown in phantom in FIG. 1. The need for lubrication of drive lines and the parts thereof is well known and need not be elaborated here. It would be appreciated, however, that often times the use of the lubrication applicator may be necessary to transfer lubricating agents from the drive line to the driven or drive members themselves. Furthermore, as shown in FIG. 13B, a lubrication applicator 120B may be employed to transfer a lubricating agent to the surfaces of the drive member 124B, or in alternative embodiments, to the driven member (not shown). In these cases, the lubricating agent will subsequently be transferred from the drive or driven member to the drive line, in this case drive line 122B, and subsequently to the other member, in this case the driven member 126B. In the examples shown in FIGS. 14A, 14B, 14C and 14D the lubrication applicators 120c, 120d, 120e and 120f are used to tension the drive line thereby picking up slack in the line which is known to be preferable for a couple of reasons. The additional effect between the effective drive line and lubrication applicator is that there is better contact between the drive line and the outer surface of the rotatable lubricating member so that an appropriate of lubrication may be metered onto the drive line. It will be further appreciated, that increasing the tension of the drive line created by the lubrication applicator acting as a tensioning idler will vary the amount of lubricating agent which is transferred from the lubrication applicator to the drive line. As greater tension is created, the interaction between the respective surfaces will increase and it is believed that a greater amount of lubricating agent will be transferred from the lubrication applicator to the drive line.

Referring now again to FIG. 1, the chain tensioning idler and lubrication applicator device 10 of the present invention includes a lubrication applicator 20 rotatably interconnected with a tensioning arm 14, a tensioner 12, tensioners are well known in the art and may be spring-biased or biased using compression rubber or the like. Some examples of tensioners which are available commercially are Rosta tensioners such as the Lovejoy Rosta elastomeric tensioner available from Lovejoy Incorporated; Universal Drive Tensioners and available from Brewer Machine and Gear Company, St. Louis, Mo.; chain tighteners available from Browning Manufacturing, Division of Emerson Electric Company, Maysville, Ky., and Boston Gear™, Division of IMO INDS., Quincy, Mass. It will be appreciated that chain tighteners, drive tighteners, and other tensioning devices are well known in the art, some of which are described in U.S. Pat. Nos. 3,071,980 and 3,630,096, the disclosures of which are incorporated herein by reference to provide further description of tensioning arms and mechanisms used to create a bias to provide tension against a drive line of the various types described herein above and envisioned herein.

Referring now again to FIG. 1, the lubrication applicators of the present invention each include an inner hub 22 and an outer lubricating portion 24. The inner hub 22 is generally made of a hard material, such as hard polymeric materials or a metal, preferably bronze or oil impregnated bronze which can rotate easily about a metal shaft or a shaft made out of a strong polymeric material or other hard materials. The shaft 18 may be selected of any material known in the art to be suitable for the purpose of rotatably engaging the inner hub 22, just as the material used to create the inner hub 22 may be chosen from a variety of hardened materials which are well known in the art to provide suitable support for the outer lubricating portion 24 of the lubrication applicator 20. Numerous metal materials, polymeric materials and other hardened materials known in the art are suitable for this purpose and are envisioned to fall within the broad general scope of the present invention.

The outer lubricating portion 24 of the lubrication applicators 20 of the present invention are generally formed by molding a lubricant containing microporous polymer matrix material around an inner hub 22. The lubricant containing polymeric matrix material envisioned in the present invention is one of many solid microporous polymer lubricants "MPLs" which are well known in the art and disclosed in the following references, each of which is hereby incorporated herein by reference: U.S. Pat. No. 3,541,011 to Davis et al; U.S. Pat. No. 4,486,319 to Jamison; U.S. Pat. No. 4,623,472 to Jamison et al; and U.S. Pat. No. 3,055,297 to Leeds. It will be appreciated that these are just a few of the solid microporous polymer lubricant "MPL" materials which are known in the art, and that any MPL which provides a microporous polymer matrix containing a lubricating agent may be used to make a lubrication applicator 20 of the present invention so long as the outer lubricating portion 24 of the lubrication applicator can be formed around the inner hub 22. A proprietary MPL sold under the mark MICROPOLY® by PhyMet, Inc. of Springboro, Ohio is a preferred MPL for the present invention. It will be appreciated that although the outer lubricating portion is generally molded around the inner hub using molding procedures which are well known in the art in respect to the various MPLs, other methods of forming the outer lubricating portion 24 around the inner hub 22 may be employed to make a lubrication applicator 20 of the present invention. These methods may include machining the outer lubricating portion from a larger piece of solid microporous polymer lubricant material, and fitting the inner hub 22 into the outer lubricating proportion 24. This method may be preferred for certain products not requiring high speed revolution if costs are reduced below that of preferred methods of manufacture such as molding and the like.

Figure 2:
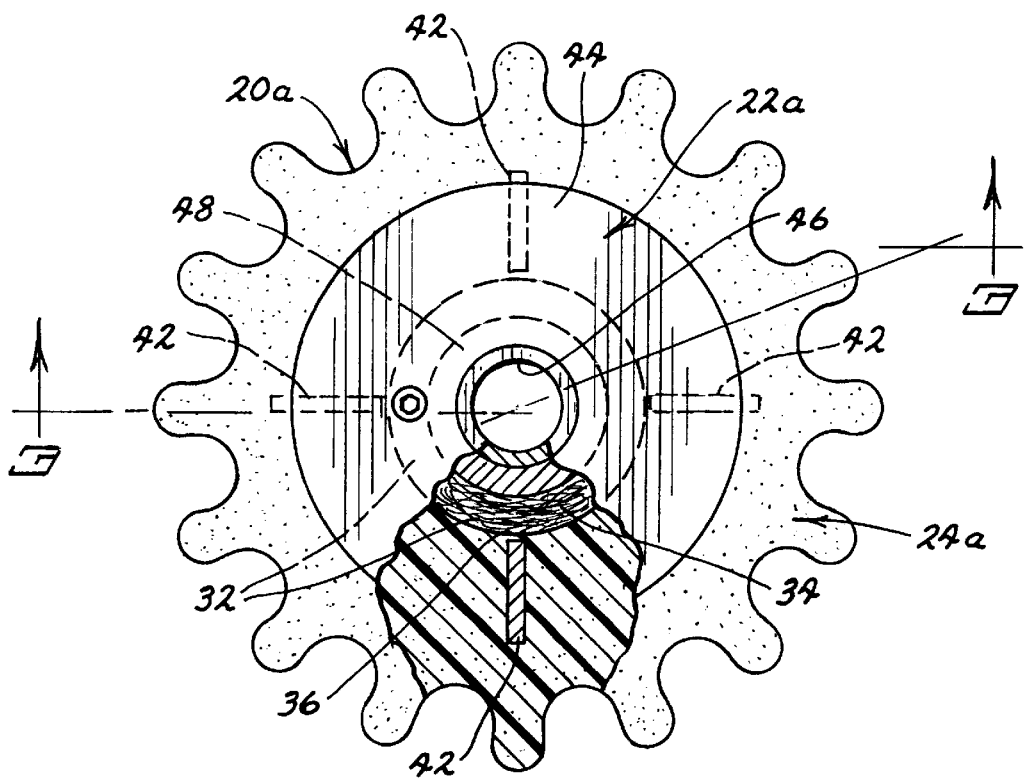
FIG. 2 is a partially broken away side view of the lubrication applicator shown in FIG. 1.
Figure 3:
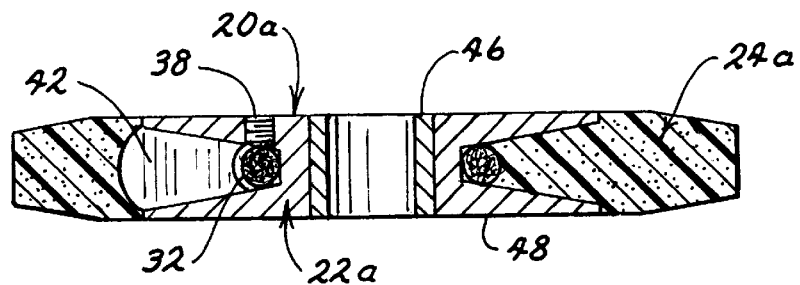
FIG. 3 is a cross sectional view of the lubrication applicator shown in FIG. 2 as seen from the line 3—3.

Referring now also to FIGS. 2 and 3 an alternate lubrication applicator 20A for rotation about a shaft is shown the alternate applicator 20A includes an inner hub 22A and an outer lubricating portion 24A.

The inner hub includes a reservoir 32 partially filled with a felt wicking material 34. And a lubricating agent 36 which is saturated into in the felt wicking material 34. Additional lubricating agent 36 may be added to the reservoir 32 by removing the closure device 38 which screws into the inner hub 22a to close a channel (not shown) from the outside of the hub to the reservoir 32. When the closure device 38 is removed, additional lubricating agent 36 may be added to the reservoir 32. The reservoir 32 is sealed when the outer lubricating portion 24a is engaged with the inner hub 22a so that lubricating agent 36 from the reservoir 32 can resupply lubricating agent in the outer lubricating portion as it is removed from the surface of the outer lubricating portion 24a.

In preferred embodiments, the lubricating agent 36 will be either a mineral oil or a petroleum based oil, preferably standard gear oil. It will be appreciated, however, that any oil which interacts in a compatible manner with the polymeric matrix in the microporous polymer lubricant may be used in the present invention including the various oils listed in the aforementioned patent references.

The alternate lubrication applicator shown in FIGS. 2 and 3 includes a number of paddle sections 42 joining left and right sidewall sections 44. The paddle sections are important to the design in that they prevent the outer lubricating portion from rotating with respect to the inner hub 22a. In the alternate embodiment the lubrication applicator 20A shown in FIGS. 2 and 3, the inner hub includes an inner ring 46 which is compression fitted with an outer ring 48 the inner ring and outer ring may be made of different materials. In a preferred embodiment, the outer ring is made of steel or hard polymeric material and the inner ring 46 is preferably made of bronze or oil impregnated bronze.

Figure 4:
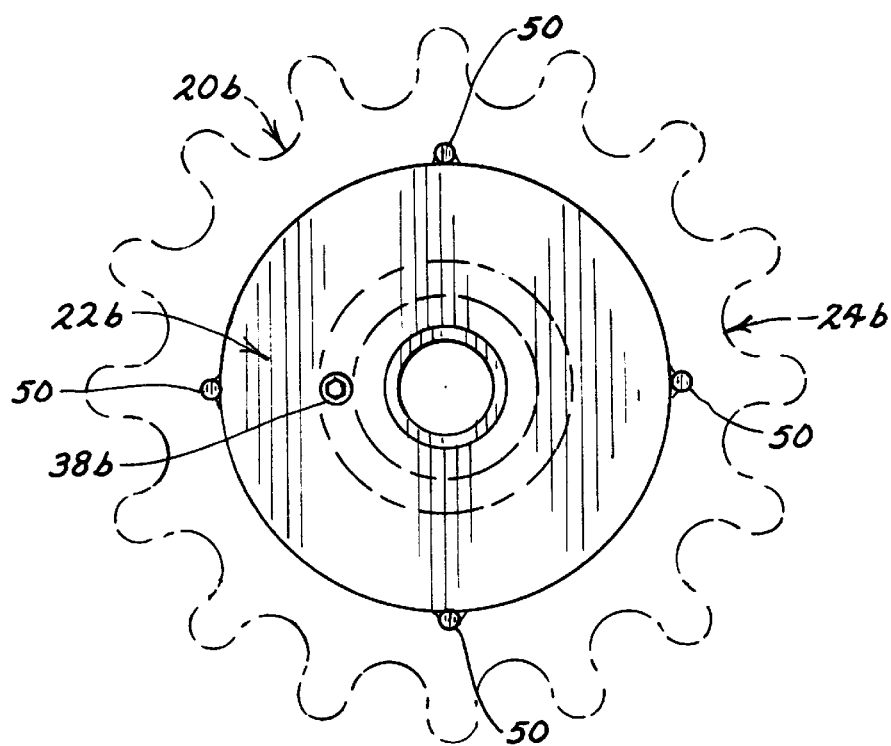
FIG. 4 is a side view of an alternate inner hub similar to that of the lubrication applicator shown in FIG. 2, and showing the outer lubrication portion of the lubrication applicator in phantom.
Figure 5:
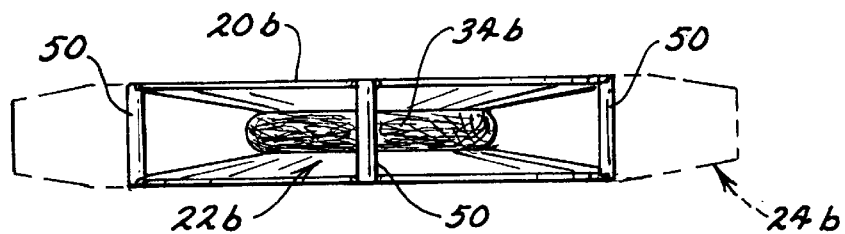
FIG. 5 is a top view of the inner hub of the lubrication applicator shown in FIG. 4 with the outer lubrication portion shown in phantom, but where the inner hub shown in FIG. 4 is turned 90° into the plane of the two-dimensional surface upon which it is represented in FIG. 4.

Referring now also to FIGS. 4 and 5, further alternate embodiment of the lubrication applicator 20b is shown with a outer lubricating 24b (shown in phantom) around an alternate inner hub 22b similar to that shown in FIGS. 2 and 3, the differences being primarily that the connecting paddle sections 42 of inner hub 22a are replaced by connecting columns or pins 50. In all of the respects, the embodiments shown in FIGS. 2 and 3 and FIGS. 4 and 5 are generally the same.

Figure 6:
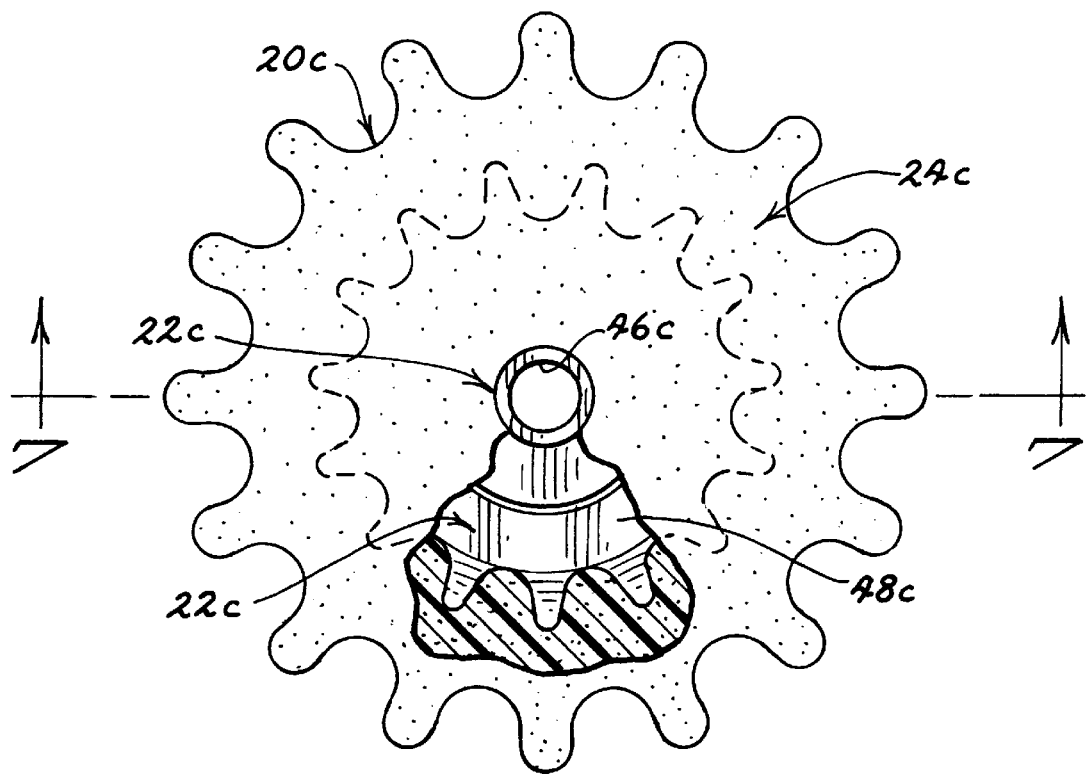
FIG. 6 is a partially broken away side view of an alternate lubrication applicator of the present invention having an alternate inner hub.
Figure 7:
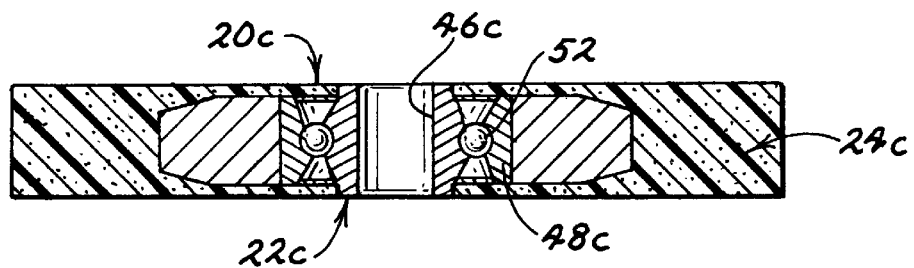
FIG. 7 is a cross-sectional view of the alternate lubrication applicator shown in FIG. 6 as seen from the line 7—7.

Referring now to FIGS. 6 and 7, a further alternate embodiment of the lubrication applicator 20c of the present invention is disclosed. The alternate lubrication applicator 20c includes an inner hub 22c virtually entirely enclosed, with the exception of an inner ring 46c by an outer lubricating portion 24c which is molded around the inner hub 22c. The inner hub 22c is essentially a sprocket having ball bearings 52 upon which the outer ring 48c is able to rotate with respect to the inner ring 46c. It will be appreciated that an inner hub to 22c of the type shown in FIGS. 6 and 7 will enable the lubrication applicator 22c of the present invention to be compression fit or bolted over the shaft so that it will not rotate with respect thereto and the remaining portions of the lubrication applicator 20c, other than the lubricator ring 26c will rotate with respect to the shaft (not shown) to which the lubrication applicator 20c is engaged.

Figure 8:
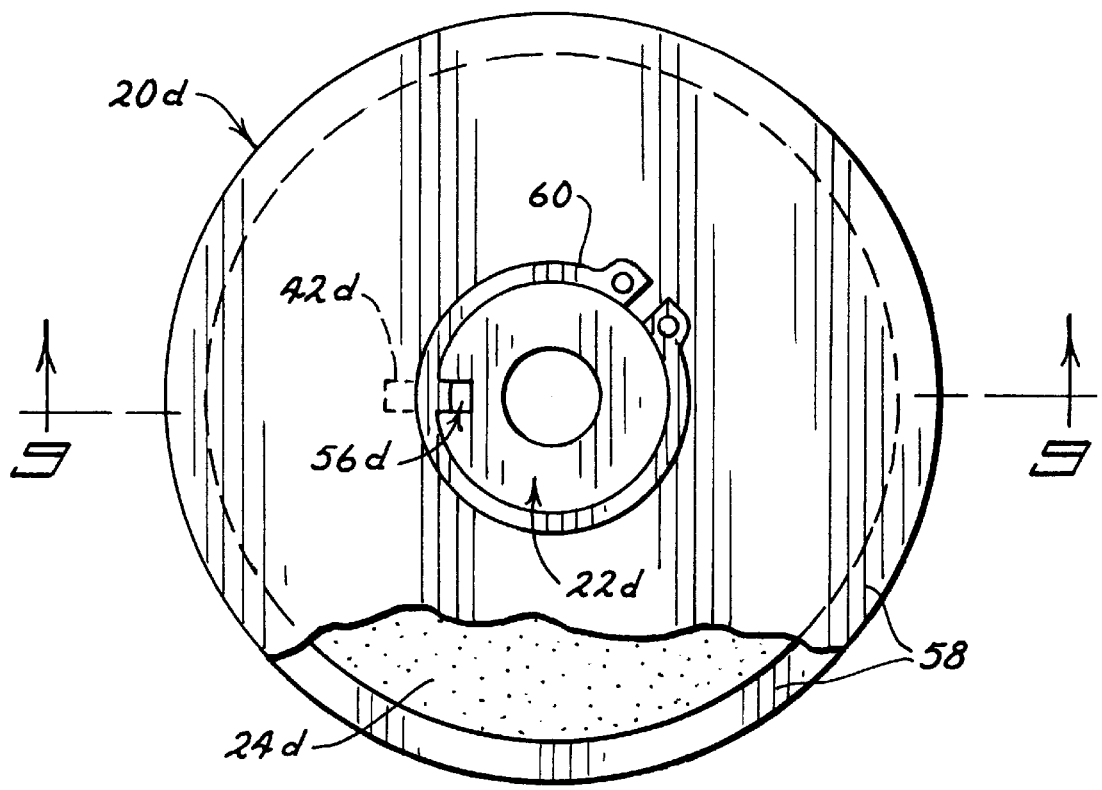
FIG. 8 is a partially broken away side view of an alternate lubrication applicator of the present invention having a relatively smooth circumferential outer surface on the outer lubrication portion of the rotatable lubricating member.
Figure 9:
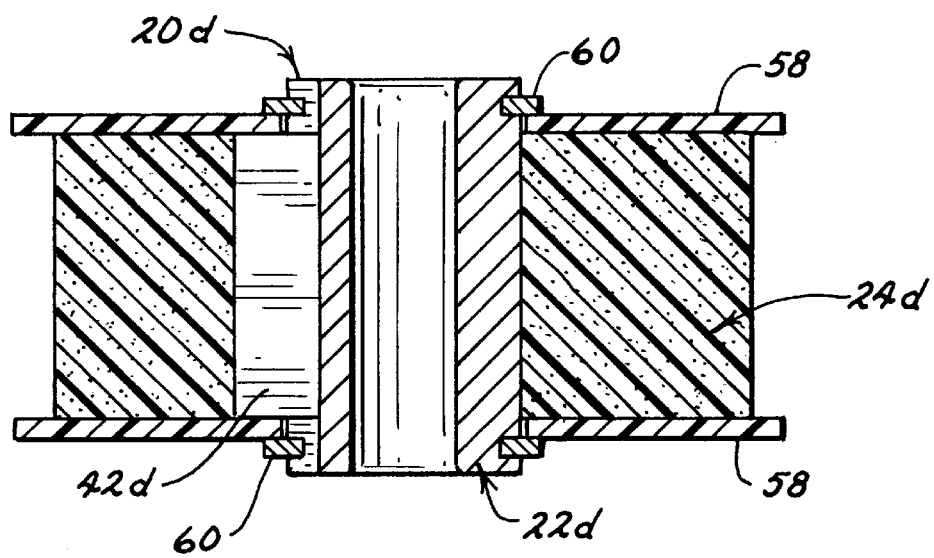
FIG. 9 is a cross-sectional view of the alternate lubrication applicator shown in FIG. 8 as seen from the line 9—9.

Referring now to FIGS. 8 and 9, a further embodiment of the present lubrication applicator 20d is shown. The applicator 20d includes an inner hub 22d having a key way 56d in which a loosely connecting key section 42d is placed. The key section 42d prevents the outer lubrication portion 24d from rotating with respect to the inner hub 22d. This particular embodiment also includes a pair of side plates 58 which are secured on either side of the inner lubricating portion 24d with the assistance of a pair of snap rings 60 the outer lubricating portion 24d has a generally smooth circumferential outer surface 28d which is designed to interact with numerous kinds of drive lines 122 (not shown) preferably cables, wire ropes, and belts which have generally smooth surfaces. It will be appreciated that the outer circumferential surface 28d of this particular embodiment may be employed with any drive line and that the outer circumferential surface 28d will wear depending on the type of drive line 122 (not shown), or for that matter gear or sprocket with which it may come into contact. For instance, if a cable or wire rope were to come into contact with the outer lubricating portion 24d of the rotating lubrication applicator 20D of the present invention over a long period of time a wear pattern would likely develop in the outer circumferential surface 28d such that it might eventually have a groove in the outer circumferential surface 28d similar to that shown in FIG. 11. Similarly, if the outer circumferential surface 28d of the applicator 20d shown in FIGS. 8 and 9 comes into contact with a roller chain (not shown) it will also develop a wear pattern which might, over a significant period of time appear to be similar to the surface characteristics shown in FIG. 10. Machined or molded profiles may also be employed to match the application. It will be appreciated that the side plates 58 may be made of any relatively hardened material but that preferred side plates 58 are made of Teflon®, or ultra high molecular weight (UHMW) polyethelyne, and the like.

Referring now to FIGS. 10 and 11 it will be appreciated, however, that the outer lubricating portion 24d of the embodiments shown in FIGS. 8 and 9 may be varied somewhat during molding of the outer lubricating portion 24d so that the outer surfaces may be shaped in a manner which one would anticipate following the wearing of the outer circumferential surface 24d so that grooves are formed such as those shown in FIGS. 10 and 11 in the outer circumferential surfaces 28e and 28f of lubrication applicators 20e and 20f, respectively, which are designed to accommodate a roller chain 6e in one case and a steel cable or wire rope 6f in the other case.

Referring now also to FIGS. 12A, 12B, and 12C, it will be further appreciated that the outer circumferential surface 28g of an outer lubricating portion 24g similar to that shown in FIGS. 8 and 9 will wear in the manner shown in this series of figures. It interacts with the teeth 70 of a gear 72 over a long period of time so that a wear pattern including a series of equally space indentations 74 will appear in the outer surface 28g of the outer lubricating portion 24g if the radius of the respective outer lubricating portion 24g and the gear 72 are appropriately coordinated to provide for repeating spacial interaction between the respective bodies.

Figure 15:
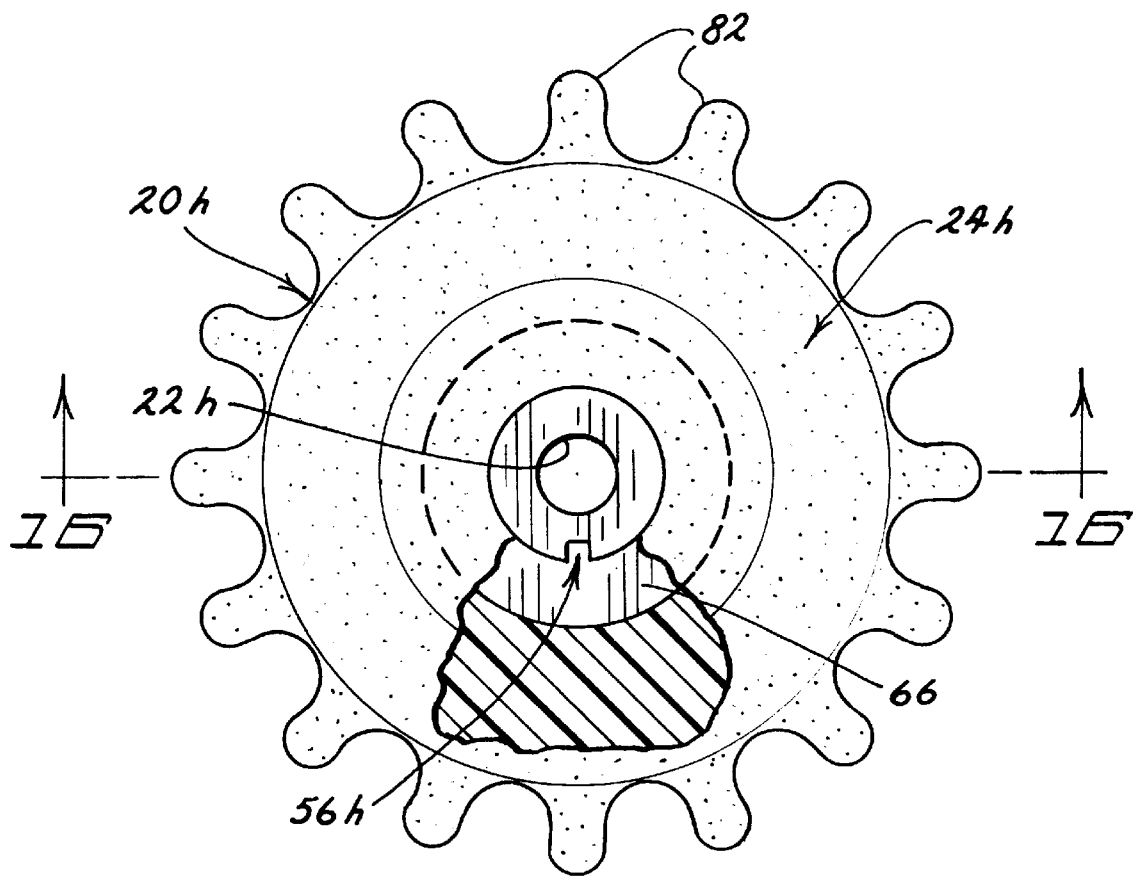
FIG. 15 is a partially broken away side view of an alternate embodiment of the lubrication applicator similar to that shown in FIG. 1 having a simplified instruction including an inner hub, a retention member and a outer lubricating portion having a tapered outer portion.
Figure 16:
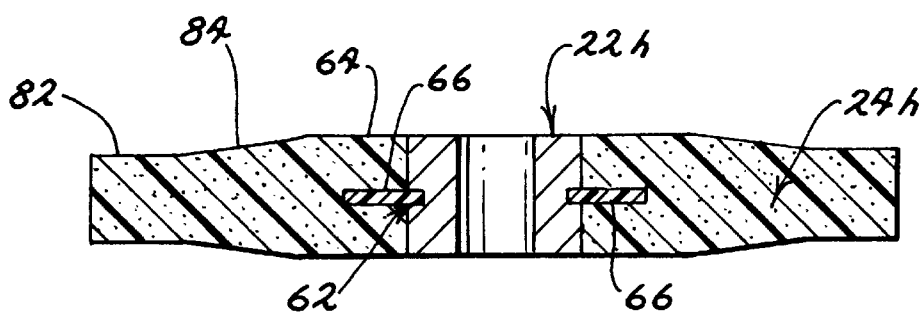
FIG. 16 is a cross-sectional view of the alternate lubrication applicator shown in FIG. 15 as seen from the line 16—16.

Referring now also to FIGS. 15 and 16, a further embodiment of the present lubrication applicator 20h is shown. The applicator includes a simple oil impregnated bronze inner hub 22h having a key way 56h which is designed to resist rotational movement of the outer lubricating portion 24h of the applicator 20h around the inner hub 22h. The inner hub also includes a circumferential key way 62 around a circumferential outer surface 64 of the inner hub 22h. The circumferential key way 62 provides a slot for a retention disk or stabilizing ring 66 which resists movement of the outer lubricating portion 24h from side to side in the inner hub 22h. It will be appreciated that his feature is a preferred feature which may be incorporated into all of the applicators of the present invention to assure easy meshing of applicators such as those shown in FIGS. 1, 2, 4, 6, and 15, having lobes or teeth which are designed to engage a drive chain. In addition, the taper provides a shoulder for enhanced contact between the outer lubricating portion 24h and the side plates on the chain, this assuring improved lubrication of the machine system. The inner hub, may be made of many materials, however, a bronze oil hub is preferred. It will also be appreciated that the lobes or teeth 82 of the outer lubricating portion 24h are tapered at the root 84 of the outer lubricating portion 24h in the present embodiment. The retention disk 66 is preferably made of a heat expandable polymeric material which enables the disk to be enlarged when heated so that it may be fitted into the slot provided by the key way 82, however, other materials may also be used.

It will be appreciated that the present lubrication applicators 20 may be used for a variety of different lubrication needs beyond industrial machinery, conveyer systems, people movers, and the like and will include use in any machines which have multiple moving parts, including motorized vehicles, bicycles, other recreational vehicles, chainsaws, lawnmowers, garden trimmers, farm equipment, carts and the like. Furthermore, the drive tensioners may be used with any sprockets, gears, pulleys, V-belt, timing belts, and flat belt drives. In addition, they may be used in a variety of systems including automatic tensioning systems having springs for spring biasing or other biasing mechanisms such as rubber elements utilized, among others, compression devices such as the LoveJoy Rosta device. Furthermore, rigid mount systems without tensioning arms may also be used.

It is to be understood, however, that even though numerous characteristics and advantages of the various embodiments of the present invention have been set forth in the foregoing description, together with details of the structure and function of the various embodiments of the invention as shown in the attached drawings, this disclosure is illustrative only and changes may be made in detail, especially in matters of shape, size and arrangement of the parts, within the principles of the present invention, to the full extent indicated by the broad general meaning of the terms in which the appended claims are expressed.

What is claimed is:

1. A rotating lubrication apparatus for rotation about a shaft to rotatably support and lubricate a machine part, the lubrication apparatus comprising:

a rotating lubrication applicator including a hub and an outer lubricating portion, the hub being substantially more resistant to wear than the outer lubricating portion; the outer lubricating portion being molded onto the hub and made from a porous lubricant containing polymeric matrix; the lubricant containing polymeric matrix be impregnated with fluidic oil such that the oil weeps from the polymeric matrix for supplying the oil to the machine part.

2. The rotating lubrication apparatus of claim 1, said rotating lubrication applicator having a recessed circumferential surface for rotatably engaging the machine part.

3. The rotating lubrication apparatus of claim 1, further comprising the combination of a tensioning mechanism including a shaft for attachment of the rotating lubrication applicator, the rotating lubrication applicator being rotatably secured onto the shaft.

4. The rotating lubrication apparatus of claim 3, said rotating lubrication applicator having a recessed circumferential surface for rotatably engaging the machine part.

5. The rotating lubrication apparatus of claim 4, said circumferential surface including a series of equally spaced apart extensions interspersed with equally spaced apart recesses, extending radially outward from the adjacent recesses for rotatably engaging the machine part.

6. The rotating lubrication apparatus of claim 1, wherein the oil is an oil selected from the group consisting of mineral oils, animal oils, and petroleum based oils.

\* \* \* \* \*